United States Patent [19]

Tomisawa

[11] Patent Number: 4,844,026
[45] Date of Patent: Jul. 4, 1989

[54] SPARK IGNITION TIMING CONTROL SYSTEM FOR INTERNAL COMBUSTION ENGINE WITH FEATURE OF SUPPRESSION OF JERKING DURING ENGINE ACCELERATION

[75] Inventor: Naoki Tomisawa, Gunma, Japan

[73] Assignee: Japan Electronic Control Systems Company, Limited, Isezaki, Japan

[21] Appl. No.: 170,360

[22] Filed: Mar. 18, 1988

[30] Foreign Application Priority Data

| Mar. 25, 1987 | [JP] | Japan | 62-69214 |
| Mar. 25, 1987 | [JP] | Japan | 62-69215 |
| Mar. 26, 1987 | [JP] | Japan | 62-70439 |

[51] Int. Cl.$^4$ .............................................. F02P 5/15
[52] U.S. Cl. ....................................... 123/422; 123/419
[58] Field of Search ............... 123/415, 416, 418, 419, 123/422, 436, 492; 364/431.05, 431.07, 431.08

[56] References Cited

U.S. PATENT DOCUMENTS

| 4,236,214 | 11/1980 | Sasayama | 364/431.07 |
| 4,257,377 | 3/1981 | Kinugawa et al. | 123/492 |
| 4,285,314 | 8/1981 | Kiencke et al. | 123/422 |
| 4,377,996 | 3/1983 | Yamaguchi | 123/416 |
| 4,389,992 | 6/1983 | Shigematsu et al. | 123/422 X |
| 4,498,438 | 2/1985 | Sato | 123/418 |
| 4,601,272 | 7/1986 | Nagai | 123/422 X |
| 4,626,997 | 12/1986 | Takeda et al. | 123/422 X |
| 4,682,577 | 7/1987 | Kato et al. | 123/422 X |
| 4,732,125 | 3/1988 | Takazawa | 123/422 |

FOREIGN PATENT DOCUMENTS

| 0233499 | 8/1987 | European Pat. Off. |
| 2531145 | 2/1984 | France. |
| 0050265 | 5/1981 | Japan | 123/422 |
| 59-126071 | 7/1984 | Japan. |
| 0003480 | 1/1985 | Japan | 123/422 |
| 2060063 | 4/1981 | United Kingdom. |
| 2175955 | 12/1986 | United Kingdom. |

Primary Examiner—Willis R. Wolfe
Attorney, Agent, or Firm—Foley & Lardner, Schwartz, Jeffery, Schwaab, Mack, Blumenthal & Evans

[57] ABSTRACT

A spark ignition control system performs spark advance adjustment during engine acceleration according to fluctuation of engine speed for compensating the fluctuation and thus for smoothly increasing the engine speed. In order to achieve this, the spark advance is advanced during a period where the engine speed drops and is retarded during a period where the engine speed increases.

25 Claims, 6 Drawing Sheets

FIG.7

SPARK IGNITION TIMING CONTROL SYSTEM FOR INTERNAL COMBUSTION ENGINE WITH FEATURE OF SUPPRESSION OF JERKING DURING ENGINE ACCELERATION

BACKGROUND OF THE INVENTION

1. Field of the Invention

The present invention relates generally to a spark ignition timing control system for an internal combustion engine, such as an automotive internal combustion engine. More specifically, the invention relates to a spark ignition timing control for suppressing jerking during engine acceleration.

2. Description of the Background Art

In general, spark ignition timing is determined relative to MBT based on preselected ignition timing control parameters, such as engine load, engine speed and so forth. The spark ignition timing for each engine cylinder is set at a timing, at which a crank reference signal representative of 70° or 66° before TDC (hereafter "70° BTDC") of each engine cylinder in compression stroke is output. Crankshaft angular position is monitored by counting crank position signals which are generated at predetermined angles, e.g. 2° or 1° increments of crankshaft angular displacement. Spark ignition is initiated at the crankshaft angular position matching the set spark ignition timing. Such general spark ignition timing control has been discussed in the Japanese Patent First (unexamined) Publication (Tokkai) Showa 59-126071.

On the other hand, there have been developed various electronic control systems for controlling engine and engine accessory control with substantially high precision. For example, it has become popular to control fuel delivery amount for engine cylinder in a manner precisely corresponding to the engine load. In modern fuel injection control systems, high precision and high response ability to fuel demand has been acheived. In such fuel injection control, acceleration enrichment is performed in response to acceleration demand which is represented by increase of throttle angular position. By acceleration enrichment, engine output torque increase precisely corresponds the acceleration demand.

However, because of intertia moment, vehicle speed and engine speed cannot be made to increase quickly enough to follow to increase of the engine output torque. This creates a torsional resonance of the engine block on the engine mounts which causes jerking of the vehicle body. Especially, in case of transversely mounted engines, wherein the magnitude of jerking tends to be amplified by the rotational torque created due to inertia of the engine block in a direction matching the direction of jerking. This clearly degrades drivability and riding comfort of the vehicle.

SUMMARY OF THE INVENTION

Therefore, it is an object of the present invention to provide a spark ignition timing control system which can control spark ignition timing in engine acceleration so as to suppress jerking.

In order to accomplish the aforementioned and other objects, a spark ignition control system, according to the present invention, performs spark advance adjustment during engine acceleration according to fluctuation of engine speed for compensating the fluctonation and thus for smoothly increasing the engine speed. In order to achieve this, spark advance is advanced during a period where the engine speed drops and is retarded during a period where the engine speed increases.

According to one aspect of the invention, a spark ignition timing control system for an internal combustion engine comprises sensor means which monitors preselected parameters for producing a sensor signal, first means for deriving a spark ignition timing on the basis of a data contained in the sensor signal, second means for detecting an engine acceleration demand for producing an accelerating condition indicative signal, and third means, responsive to the accelerating condition indicative signal, for modifying the spark ignition timing derived by the first means after a first predetermined period of time from occurence of the the accelerating condition indicative signal, in such a manner that spark ignition timing is advanced and retarded for suppressing cycle-to-cycle fluctuations of engine speed and for smoothly accelerating engine speed.

According to another aspect of the invention, a spark ignition timing control system for an internal combustion engine comprises sensor means monitoring preselected parameters for producing sensor signals including engine speed indicative data and engine load indicative data, first means for deriving a spark ignition timing on the basis of data contained in the sensor signal, second means for monitoring engine load indicative data for detecting engine acceleration demand for producing accelerating condition indicative signal, and third means, responsive to the accelerating condition indicative signal, for modifying the spark ignition timing derived by the first means in such a manner that spark ignition timing is advanced and retarded for suppressing cycle-to-cycle fluctuation of engine speed and for smoothly increasing engine speed during a predetermined acceleration transition period.

Preferably, the third means is active for a predetermined acceleration transition period of time which is longer than the first predetermined period of time. During the period, in which jerking suppressive spark ignition timing is performed, the third means advances the spark ignition timing in response to engine speed fluctuation in the decelerating direction and retards the spark ignition timing in response to engine speed fluctuation in accelerating direction. The third means varies the magnitude of advancing and retarding spark ignition timing in response to engine speed fluctuation as a function of the engine speed.

The third means is responsive to the accelerating condition indicative signal to retard spark ignition timing by a predetermined magnitude and subsequently advance the spark ignition timing by a given magnitude which is substantially smaller than the predetermined retarding magnitude, during the first predetermined period. The third means advances the spark ignition timing in response to engine speed fluctuation in the decelerating direction and retards the spark ignition timing in response to engine speed fluctuation in the accelerating direction, during a second predetermined period of time following the first predetermined period in the acceleration transition period.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
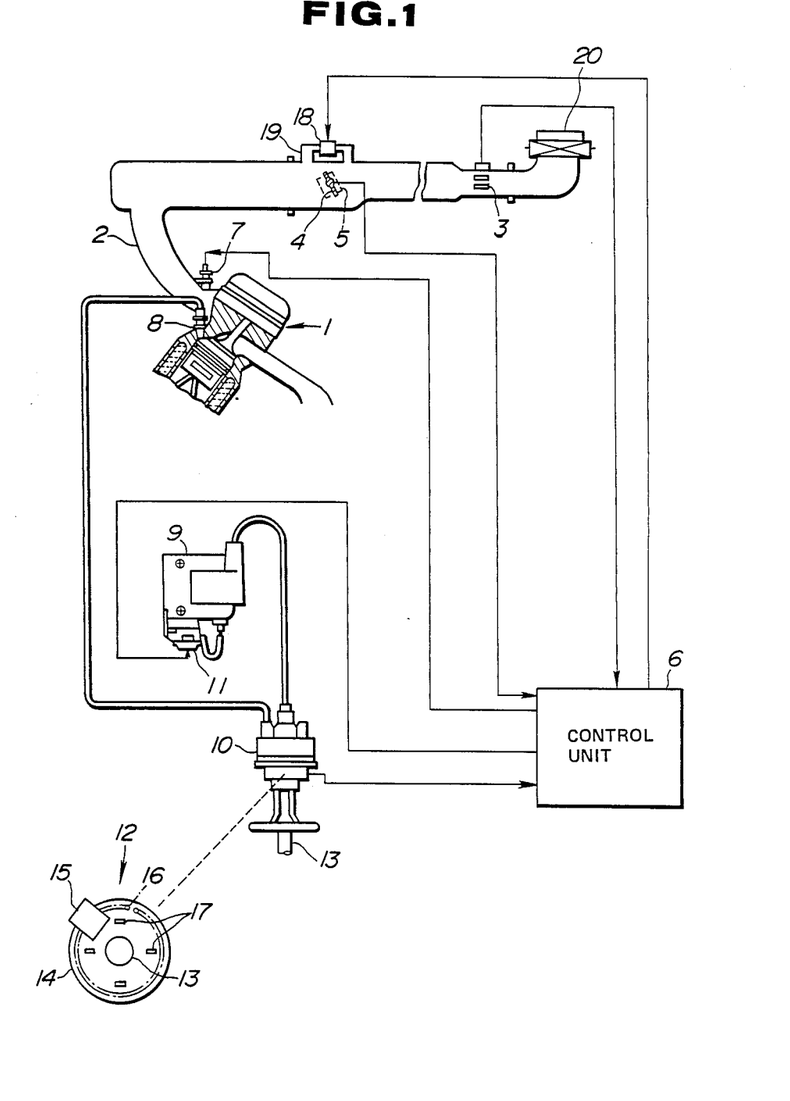
FIG. 1 is a schematic block diagram of the preferred embodiment of a spark igntiion control system, according to the present invention.

Referring now to the drawings, particularly to FIG. 1, the preferred embodiment of a spark ignition control system is directed to control spark ignition timing for an internal combustion engine which is generally represented by the reference numeral "1". In the shown embodiment, the internal combustion engine 1, with which the preferred embodiment of the spark ignition control system is associated, is a so-called "sequential injection type" fuel injection internal combustion engine. In the construction illustrated in FIG. 1, the engine has an induction system 2, in which is disposed an air flow meter 3 for monitoring air flow rate Q as the engine load indicative data and producing an air flow rate indicative signal. A throttle chamber is defined in the induction system 2 to pivotably receive therein a throttle valve 4. A throttle angle sensor 5 is associated with the throttle valve 4 in order to monitor the throttle valve angular position and to produce a throttle angle indicative signal. The induction system has an intake manifold including a plurality of branches, each of which is connected to an intake port of a corresponding one of engine cylinders.

In order to perform sequential fuel injection, fuel injection valves 7 are inserted into respective branches of the intake manifold to inject controlled amount of fuel at respective controlled timings. Namely, the fuel injection timing of each fuel injection valve 7 is so controlled as to perform fuel injection in synchronism with engine revolution cycle to deliver the fuel through the intake port in the form of an air/fuel mixture during the intake valve open period.

Spark ignition plugs 8 are inserted into respective engine cylinder for causing spark ignition at respectively and independently controlled timings. The spark ignition plugs 8 are connected to a distributor 10 which distributes high voltage induced in a secondary coil in a ignition coil 9. A power transistor 11 is coupled with the ignition coil 9 for controlling the timing of induction of high voltage in the secondary coil thereof.

A crank angle sensor 12 is incorporated in the distributor 10. The crank angle sensor 12 thus monitors crankshaft angular position by monitoring rotor position in the distributor 10. Namely, since the rotor in the distributor rotates precisely in synchronism with rotation of the crankshaft, the crankshaft angular position can be monitored by monitoring the angular position of the rotor. In order to monitor the rotor angular position, a rotary disc 14 is rigidly fixed to a distributor shaft 13 so that the rotary disc may be driven with the rotor by means of the distributor shaft.

A plurality of crank position signal slits 16 and a plurality of crank reference signal slits 17 are formed through the rotary disc 14. The crank position signal slits 16 are arranged in alignment along the outer peripheral edge of the rotary disc with a center-to-center interval corresponding to 2° of crank shaft angular displacement. On the other hand, the crank reference signal slits 17 are arranged at radially shifted positions from the crank position signal slits 16. The crank reference signal slits 17 are circumferentially oriented at positions corresponding to 70° BTDC of respectively corresponding engine cylinder in compression stroke.

Since the shown embodiment is directed to 4-cylnder engine, four crank reference signal slits are formed in the rotary disc 14 with center-to-center interval of 90° in circumferential direction. Since the distributor rotates at a speed half that of the crankshaft, the rotor rotates one cycle while crankshaft rotates the two cycles which comprise one engine revolution cycle. Therefore, the 90° intervals between the crank reference signal slots 17 as spaced represent the crankshaft angular positions which are separated by 180°.

Opposing the rotary disc 14, an optical sensor 15 is provided to detect respective slits 16 and 17. The sensor 15 outputs crank position signals $\zeta_{pos}$ at every given angular displacement intervals (40°) of the crankshaft. The sensor also produces the crank reference signals $\theta_{ref}$ representative of the 70° BTDC crankshaft position for the respective engine cylinders in compression stroke.

In the preferred construction, one of the four crank reference signal slits 17 the one which corresponds to 70° BTDC of No. 1 cylinder, is provided a different circumferential width so that the pulse width of the crank reference signal $\theta_{ref}$ to be generated thereby can be distinguished from the crank reference signals generated by the other crank reference signal slits. This unique width crank reference signal $\theta_{ref}$ thus enables identification of the engine cylinder in compression stroke.

In the construction of FIG. 1, the induction system 2 includes an idling air passage 19 by-passing the throttle chamber. A idling speed adjuster mechanism 18 is provided in the idling air passage 19 for adjusting idling speed according to the engine driving condition. The induction system also incorporates an air cleaner 20.

The air flow meter 3, the throttle angle sensor 5 and crank angle sensor 12 are connected to a microprocessor-based control unit 100. Though it is not illustrated, the control unit 100 may be also connected to various sensors, such as an engine coolant temperature sensor, a starter motor and so forth, to receive therefrom correction parameters for correcting spark advance angle.

Figure 2:
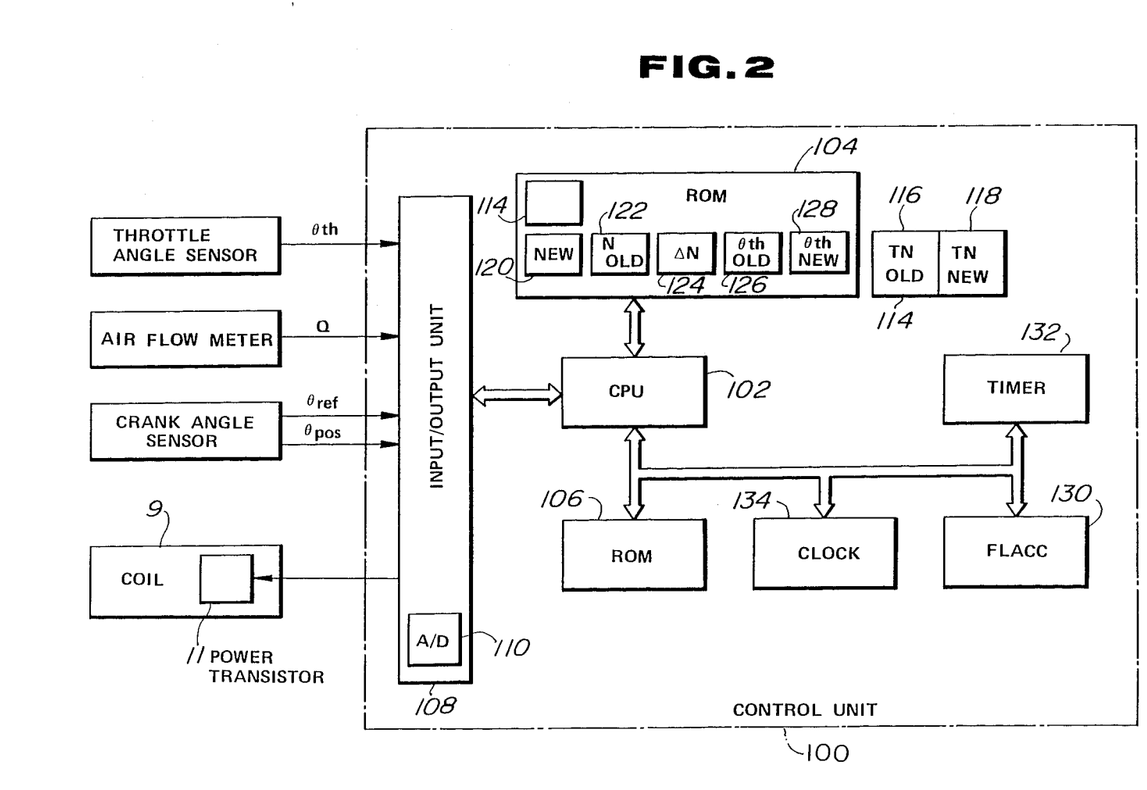
FIG. 2 is a block diagram explanatorily showing the detailed construction of a control unit in the preferred embodiment of the spark ignition control system of FIG. 1.

FIG. 2 explanatorily shows detailed construction of the control unit 100 to be employed in the preferred embodiment of the spark ignition timing control system according to the invention. As set forth, the control unit 100 comprises a microprocessor having CPU 102, RAM 104, ROM 106 and input/output unit 108. The input/output unit 108 may have an analog-to-digital converter 110 for converting analog input, such as the throttle angle signal $\theta_{th}$, the intake air flow rate indicative signal Q and so forth, into digital signals so that the control unit 100 may process those signals in digital manner.

Further detailed construction of the control unit illustrated in FIG. 2 will be explained later during the discussion of the preferred process of spark ignition timing control to be performed by the preferred embodiment of the spark ignition timing control system.

The control unit 100 executes various routines for performing spark ignition timing control. Namely, basic spark advance ADV is determined based on the the engine speed N and a Tp value ($K \times Q/N$:K is constant) at predetermined timing intervals, e.g. every 10 ms. Various correction routines for correcting the basic spark advance AVD are executed at respectively predetermined timings for adjusting the spark advance according to various correction factors, such as engine knocking condition, engine coolant temperature and so forth. Further routine is performed for setting spark ignition timing data to the input/output unit 108 for causing the spark ignition to occur at the timings derived. In practice, this routine for setting the spark timing data in the input/output unit 108 is performed in response to every crank reference signal $\theta_{ref}$.

These routines are well known to those skilled in the art and need not be discussed in detail.

Figure 3:
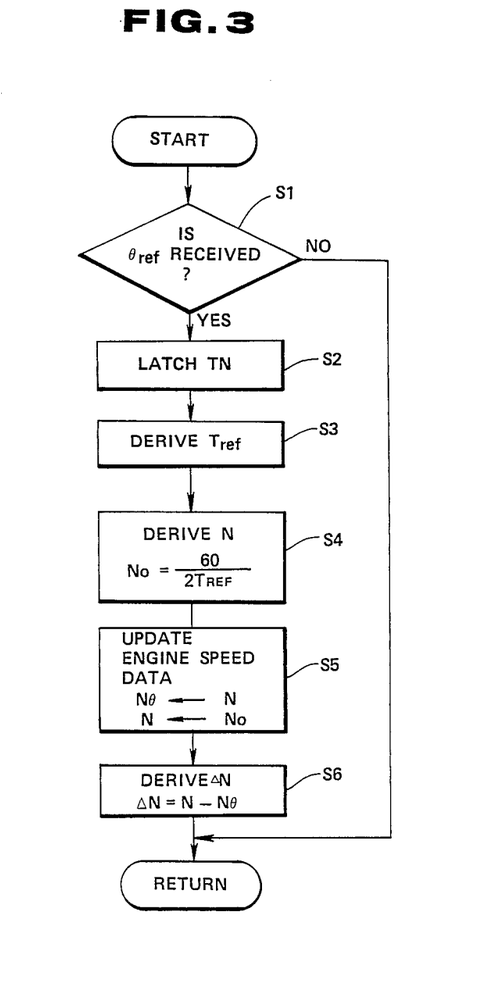
FIG. 3 is a flowchart of a routine for deriving engine speed variation magntide $\Delta N$.

FIG. 3 shows a flowchart of routine for deriving the engine speed data N and detecting engine speed variation. In the process, first, a check is performed to determine whether the crank reference signal $\theta_{ref}$ is received, at a step S1. If the crank reference signal $\theta_{ref}$ is not detected as checked at the step S1, process goes END. On the other hand, when the crank reference signal $\theta_{ref}$ is detected as checked at the step S1, an engine speed timer value TN in an engine speed timer 112 is latched and transferred to a memory block 114 of an engine speed timer register 116 at a step S2. The engine speed timer register 116 has another memory block 118 for storing engine speed timer value $TN_{old}$ representative of input timing data of immediately preceding crank reference angle signal $\theta_{ref}$.

Based on the crank reference signal input timing data stored in the memory blocks 114 and 118, an interval $T_{ref}$ between the occurences of the crank reference signals $\theta_{ref}$ is derived at a step S3. The engine speed N is then derived according to the following equation:

$$N = 60/2T_{ref}$$

at a step S4. The fresh engine speed data $N_{new}$ thus derived a t the step S4 is set in a memory block 120 in RAM 104, which memory block serves as a temporary register for temporarily storing the $N_{new}$ data, at a step S5. The RAM 104 also has another memory block 122 for temporarily storing engine speed data $N_{old}$ which is derived in the immediately preceding execution cycle at occurence of the immediately preceding crank reference signal. Upon setting the fresh engine speed data $N_{new}$ at the step S5, the engine speed data stored in the memory block 120 is transferred to the memory block 122. Therefore, at the step S5, the engine speed data is updated.

Based on the engine speed data $N_{new}$ and $N_{old}$ stored in the memory blocks 120 and 122, an engine speed variation data $\Delta N$ is derived at a step S6. The derived engine speed variation data $\Delta N$ is stored in a memory block 124 of RAM 104. After the process at the step S6, process returns to the main routine which governs various spark ignition timing control routines.

Figure 4:
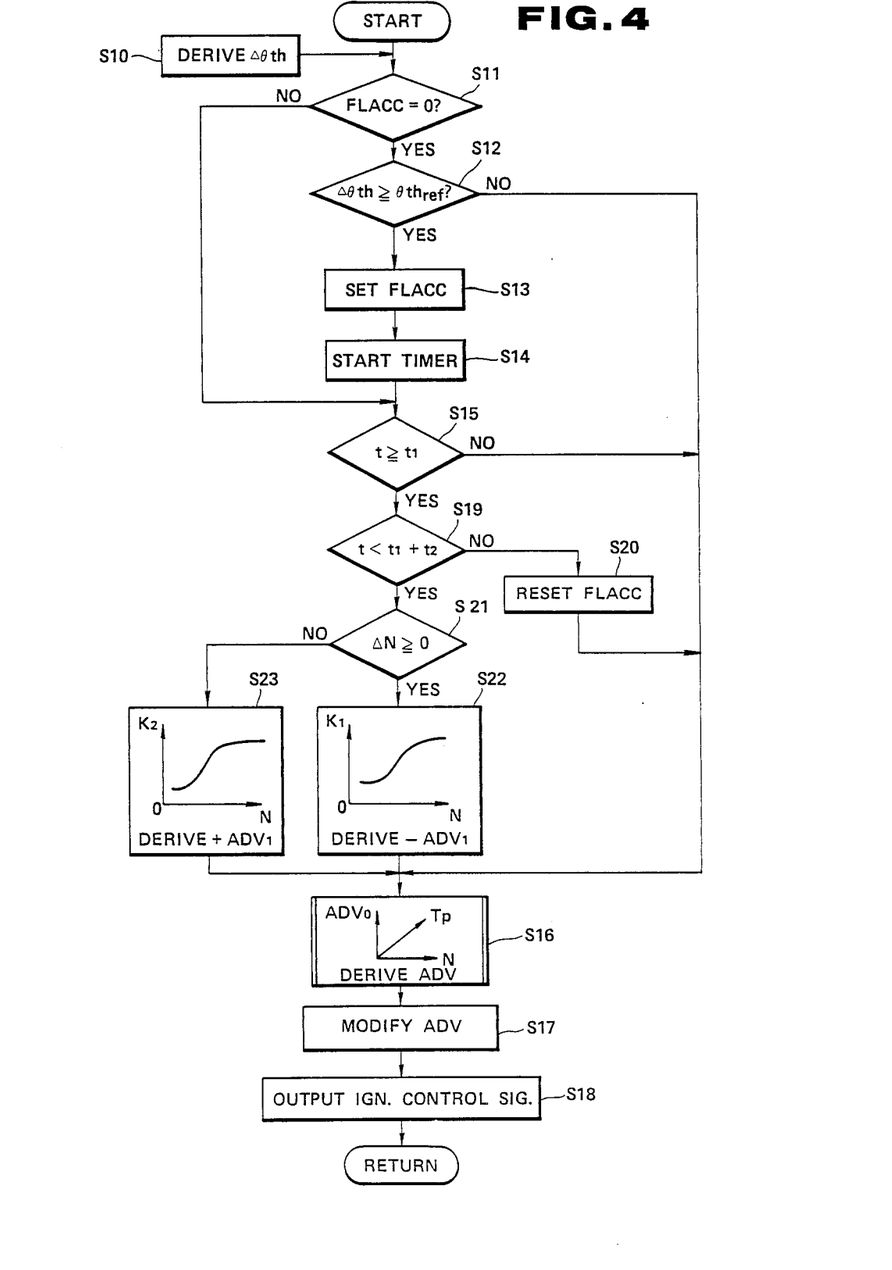
FIG. 4 is a flowchart of a routine for controlling spark ignition timing.

FIG. 4 is a routine for deriving spark ignition timing and outputting a spark ignition timing control signal. The routine shown in FIG. 4 is executed at predetermined timing intervals, e.g. every 10 ms to 30 ms.

Immediately after starting execution of the routine of FIG. 4, throttle angle signal $\theta_{th}$ is read for deriving variation of the throttle valve angular position, at a step S10. In practice, the throttle angular variation can be derived by comparing the throttle angle signal value $\theta_{th}$ read in the current cycle of execution of the routine of FIG. 4 with that read in the immediately preceding cycle. In order to enable this, memory blocks 126 and 128 are provided in RAM for storing the throttle angle data $\theta th_{old}$ and $\theta th_{new}$. At the process S10, the throttle angle data is updated and subsequently a throttle valve open angle variation indicative data $\Delta \theta_{th}$ ($\theta th_{new} - \theta th_{old}$) is derived. At a step S11, an engine accelerating condition indicative flag FLACC which is to be set in an engine acceleration indicative flag register 130 in the control unit 100, is checked. When the engine acceleration indicative flag FLACC is not set as checked at the step S11, a check is performed to determine whether the throttle valve open angle variation indicative data $\Delta \theta_{th}$ is greater than a predetermined acceleration criterion $\theta th_{ref}$, at a step S12.

When the throttle valve opening angle variation indicative data $\Delta \theta_{th}$ is greater than or equal to the acceleration criterion $\theta th_{ref}$, as checked at the step S12, the engine acceleration indicative flag FLACC is set at a step S13. Then, an acceleration transition timer 132 in the control unit 100 is triggered at a step S14. Therefore, the acceleration transition timer 132 starts to count up clock pulses generated by a clock generator 134.

After starting the acceleration transistion timer 132 at the step S14, or when the engine acceleration indicative flag FLACC is set as checked at the steo S11, the process goes to a step S15. At the step S15, the acceleration transition timer valve t of the acceleration transition timer 132 is compared with a first reference timer value $t_1$. The first reference timer value $t_1$ represents a predetermined initial period through which jerking suppressive spark ignition timing control is not performed. Therefore, in this $t_1$ period, the spark ignition timing is determined simply depending upon the normal spark ignition control parameters and correction parameters. Because of engine acceleration demand, the engine speed N increases to cause advance of the spark advance accordingly.

Therefore, when the acceleration transition timer value t is smaller than the first reference timer value $t_1$, process goes to a step S16 to determine a basic spark advance ADV on the basis of the Tp value and the engine speed N. In practical procedure, derivation of the basic spark advance ADV is performed by table look-up utilizing a known three dimentional loo-up table set in ROM 106. The basic spark advance AVD is corrected at a step S17 based on various correction factors, such as engine temperature condition, engine knocking condition and so forth. Through the process in the step S17, actual spark ignition timing is derived. Based on the spark ignition timing derived at the step S17, spark ignition control signal is output at a step S18.

On the other hand, when the acceleration transition timer value t is greater than or equal to the first reference timer value $t_1$ as checked at the step S15, the acceleration transition timer value t is compared with a second reference timer value $t_{tr}$ ($t_1+t_2$: where $t_2$ represents a predetermined period for performing jerking suppressive spark ignition timing control), at a step S19. When the acceleration transition timer value t is greater than or equal to the second reference timer value $t_{tr}$, the engine acceleration condition indicative flag FLACC is reset at a step S20 and thereafter the process goes to the step S16 so that the spark ignition timing will be determined without including the jerk suppressive correction factor.

On the other hand, when the acceleration transition timer value t is smaller than the second reference timer value $t_{tr}$, the engine speed variation indicative value $\Delta N$ is compared with zero at a step S21.

Figure 5:
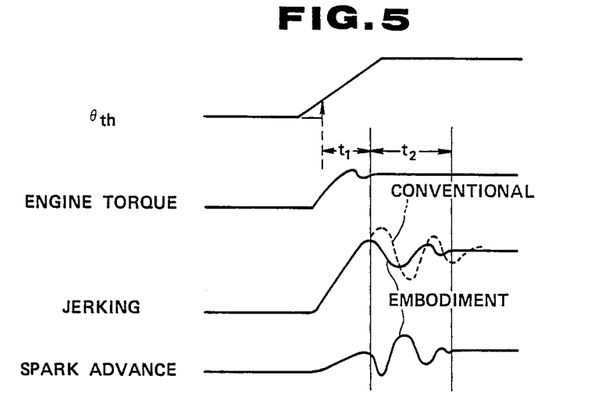
FIG. 5 is a chart showing variation of throttle valve angular position, engine output torque, magnitude of jerking and spark ignition timing during engine acceleration, as controlled utilizing the routine of FIG. 4.

Here, reference is made to FIG. 5, in which are shown engine output torque variation variable during engine acceleration in response to increase of the throttle open angle. As set forth, during this engine acceleration period, engine speed tends to fluctuate due to inertia moment for causing longitudinal moment which results in rocking of the engine block on the engine mount due to torsional variation effects at resonant speeds and thus in jerking as shown in FIG. 5. Therefore, in the preferred embodiment of the spark ignition control system, according to the invention, spark ignition timing is so adjusted as to advance the timing while the engine speed decreases and to retard while the engine speed increases during acceleration transition. Such adjustment of the spark ignition timing reduces drive torque fluctuation in the power train of the vehicle and thus reduces the magnitude of jerking to be caused during engine acceleration transition.

In view of this, when the engine speed variation indicative data $\Delta N$ is greater than or equal to zero, which engine speed variation indicative data represents increasing of engine speed, jerking suppressive correction value for retarding spark advance ADV is determined at a step S22. In the practical process, the jerking suppressive spark advance retarding magnitude $-ADV_1$ is determined according to the following equation:

$$-ADV_1 = \Delta N \times k_1$$

where $k_1$ is a coefficient variable depending upon the engine speed and derived by looking-up a map or table which contains experimentally determined values in relation to the engine speed N.

Figure 6:
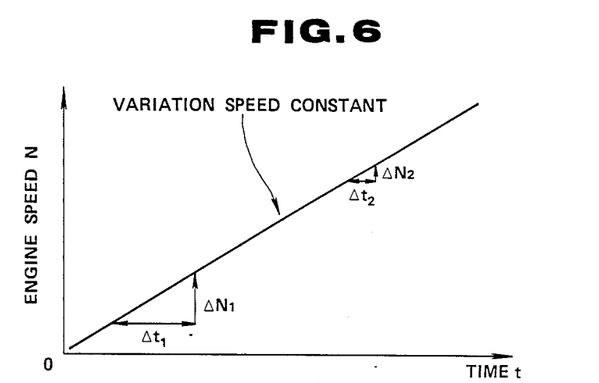
FIG. 6 is a graph showing relationship between engine speed and $\Delta N$ derivation cycle.

The engine speed dependent variation of the coefficient $K_1$ is necessary in order to compensate for variation in the length of the engine speed sampling period depending upon the engine speed. Namely, as shown in FIG. 6, the engine speed variation indicative data $\Delta N$ may vary depending upon engine speed sampling timing. For instance, when the engine speed is relatively low, the intervals $\Delta t_1$ between occurences of the crank reference signals $\theta_{ref}$ becomes greater than that $\Delta t_2$ sampled at high engine speed range. In the example of FIG. 6, though the acceleration rate is unchanged, the engine speed variation indicative data $\Delta N_1$ as sampled in the interval $\Delta t_1$ becomes much greater than the data $\Delta N_2$ as sampled in the interval $\Delta t_2$. Since the relationship between the sampling period and engine speed variation indicative value difference will be constant with respect to any given engine, it can be compensated by varying the $k_1$ value according to known engine speed dependent characteristics.

The jerking suppressive correction value $-ADV_1$ as derived at the step S22 is utilized in the spark advance correction to be performed in the step S17 set forth above as one of the spark advance correction factors.

On the other hand, when the engine speed variation indicative value $\Delta N$ is smaller than zero, which represents decreasing of the engine speed, a correction value $+ADV_1$ for advancing the spark advance is determined according to the following equation:

$$ADV_1 = \Delta N \times k_2$$

where $k_2$ is a correction value variable depending upon the engine speed and derived by looking-up a map or table which contains experimentarily determined values in relation to the engine speed N at a step S23. The jerking suppressive correction value $+ADV_1$ derived at the step S23 is also used in correction of the spark advance ADV at the step S17.

On the other hand, when the throttle valve open angle variation indicative data $\Delta\theta_{th}$ as checked at the step S13 is smaller than the acceleration criterion, which would indicate that the engine is not in an accelerating state, the process directly goes to the step S16 after the step S13.

Figure 7:
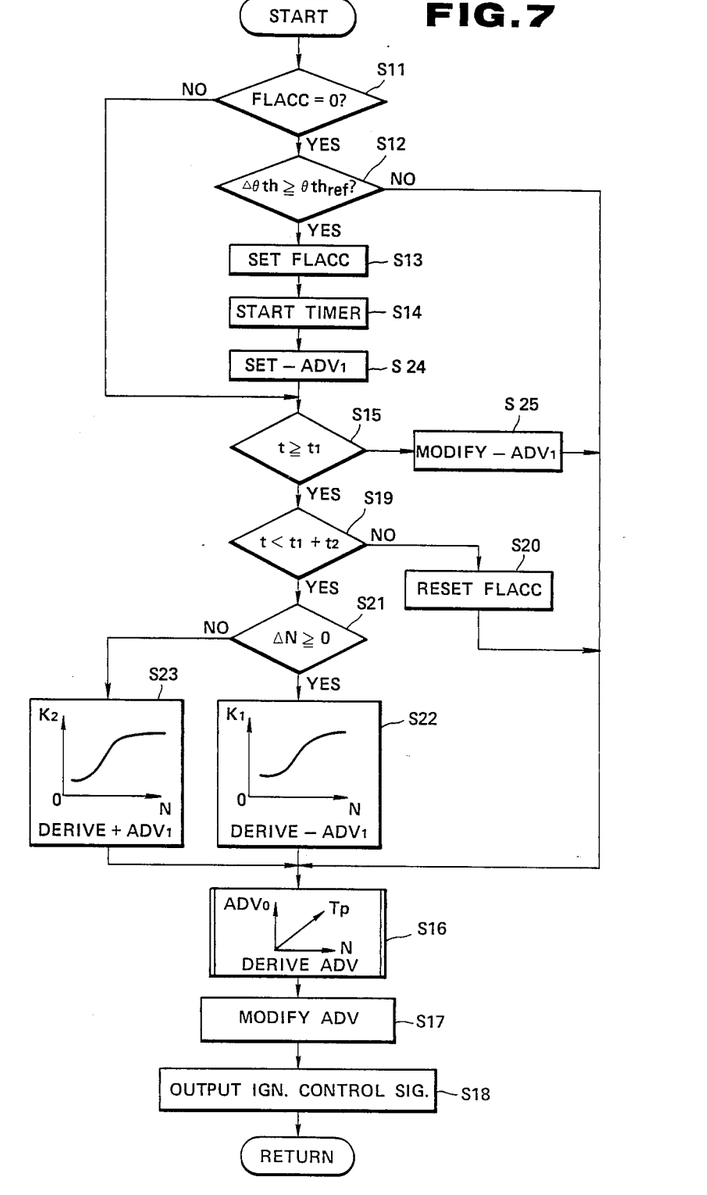
FIG. 7 is a flowchart showing modification of routine for controlling spark ignition timing.

FIG. 7 is a modified version of the routine of that in FIG. 4. In the modified routine, the spark adnace is initially retarded in response to occurrence of the acceleration demand for making the acceleration transition further smoother. Since the process of the jerking suppressive spark ignition timing control is substantially the same as that discussed with respect to the routine of FIG. 4. Therefore, the following discussion will be directed to the details of the process which are different from that of the routine of FIG. 4. The process steps common to the former routine will be represented by the same step numbers and the detailed discussion thereof will be neglected.

Figure 8:
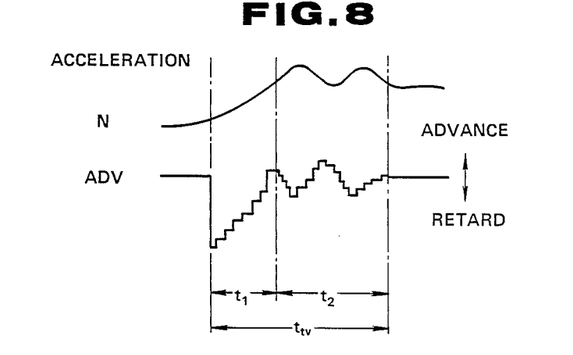
FIG. 8 is a chart showing relationship of engine speed and spark advance as controlled utilizing the routine of FIG. 7.

In the shown routine, a step S24 is added between the steps S14 and S15. At the step S24, an initial spark advance retarding correction value $-ADV_1$ is set. The initial spark advance retarding correction value $-ADV_1$ to be initially set is a fixed value. By this spark advance retarding correction value $-ADV_1$ as set at the step S24 is utilized for temporarily retarding the spark advance in response to the occurence of engine acceleration, as shown in FIG. 8. In the practical operation, the spark advance retarding correction value $-ADV_1$ set at the step S24 is used in correction process for the spark advance performed in the step S17.

Another step S25 is also added between the steps S15 and S16. In the step S25, the spark advance retarding correction value $-ADV_1$ as set at the step S24 is modified to reduce retarding magnitude to a given value. Therefore, during the $t_1$ period, the spark advance once retarded by a given magnitude depending on the initial spark advance retarding correction value $-ADV_1$, is advanced by a given magnitude, as shown in FIG. 8.

As will be appreciated, though the routine of FIG. 7 clearly degrades acceleration response characteristics at the initial moment of engine acceleration, it clearly improves the drivability and riding comfort by providing smooth acceleration transition.

As will be appreciated, the spark ignition timing control system according to the present invention, is successful in suppressing jerking which tends to occur during acceleration transition period. Therefore, the invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A spark ignition timing control system for an internal combustion engine comprising:
   sensor means monitoring preselected parameters for produicing a sensor signal;
   first means for deriving a spark ignition timing on the basis of data contained in said sensor signal;
   second means for detecting an engine acceleration demand for producing an accelerating condition indicative signal; and
   third means, responsive to said accelerating condition indicative signal, for modifying said spark ignition timing derived by said first means after expiration of a first predetermined period of time of occurence of said accelerating condition indicative signal, in such a manner that the spark ignition timing is advanced and retarded for suppressing cycle-to-cycle fluctuation of engine speed and for smoothly increasing engine speed.

2. A spark ignition timing control system as set forth in claim 1, wherein said third means is active for a predetermined acceleration transition period of time which is longer than said first predetermined period of time.

3. A spark ignition timing control system as set forth in claim 2, wherein said third means advances said spark ignition timing in response to engine speed fluctuation in the decelerating direction and retards said spark ignition timing in response to engine speed fluctuation in the accelerating direction.

4. A spark ignition timing control system as set forth in claim 3, wherein said third means varies the magnitude of advancing and retarding of the spark ignition timing in response to engine speed fluctuation according to an engine speed.

5. A spark ignition timing control system as set forth in claim 4, wherein said third means derives said magnitude of advancing or retarding of the spark ignition timing as a function of the engine speed.

6. A spark ignition timing control system as set forth in claim 1, wherein said third means is responsive to said accelerating condition indicative signal to retard spark ignition timing by a predetermined magnitude and subsequently advance the spark ignition timing by a given magnitude which is substantially smaller than said predetermined retarding magnitude, during said first predetermined period.

7. A spark ignition timing control system as set forth in claim 6, wherein said third means advances said spark ignition timing in response to engine speed fluctuation in the decelerating direction and retards said spark ignition timing in response to engine speed fluctuation in the accelerating direction, during a second predetermined period of time following said first predetermined period in said acceleration transition period.

8. A spark ignition timing control system as set forth in claim 7, wherein said third means varies the magnitude of advancing and retarding of the spark ignition timing in response to engine speed fluctuation according to engine speed.

9. A spark ignition timing control system as set forth in claim 8, wherein said third means derives said magnitude of advancing or retardingof the spark ignition timing as a function of the engine speed.

10. A spark ignition timing control system as set forth in claim 5, wherein said second means is associated with a throttle angle sensor which monitors a throttle valve angular position to produce a throttle angle signal, for detecting increase of throttle valve angular displacement to increase throttle valve open angle in a ratio greater than a predetermined value for producing said accelerating condition indicative signal.

11. A spark ignition timing control system as set forth in claim 10, wherein said sensor means comprises a crank angle sensor for producing a crank reference signal at every predetermined angular position of a crankshaft, and said first means derives said engine speed on the basis of the interval between subsequently occurring crank reference signals.

12. A spark ignition timing control system as set forth in claim 11, wherein said third means is responsive to said accelerating condition indicative signal to retard spark ignition timing by a predetermined magnitude and to subsequently advance the spark ignition timing by a given magnitude which is substantially smaller than said predetermined retarding magnitude, during said first predetermined period.

13. A spark ignition timing control system for an internal combustion engine comprising:
   sensor means monitoring preselected pamaters for produicing sensor signals including engine speed indicative data and engine load indicative data;
   first means for deriving a spark ignition timing on the basis of data contained in said sensor signal;
   second means for monitoring an engine load indicative data for detecting an engine acceleration demand for producing an accelerating condition indicative signal; and
   third means, responsive to said accelerating condition indicative signal, for modifying said spark ignition timing derived by said first means in such a manner that spark ignition timing is advanced and retarded for suppressing cycle-to-cycle fluctuation of engine speed and for smoothly increasing engine speed during a predetermined acceleration transition period.

14. A spark ignition timing control system as set forth in claim 13, wherein said third means is active for a predetermined acceleration transition period of time which is longer than said first predetermined period of time.

15. A spark ignition timing control system as set forth in claim 14, wherein said third means advances said spark ignition timing in response to engine speed fluctuation in the decelerating direction and retards said spark ignition timing in response to engine speed fluctuation in the accelerating direction.

16. A spark ignition timing control system as set forth in claim 15, wherein said third means varies the magnitude of advancing and retarding of the spark ignition timing in response to engine speed fluctuation, as a function of the engine speed.

17. A spark ignition timing control system as set forth in claim 16, wherein said third means is active after expiration of a first predetermined period from occurrence of said acceleration indicative signal, to modify said spark ignition timing.

18. A spark ignition timing control system as set forth in claim 13, wherein said third means is active after expiration of a first predetermined period from occurrence of said acceleration indicative signal, to modify said spark ignition timing.

19. A spark ignition timing control system as set forth in claim 18, wherein said third means is responsive to said accelerating condition indicative signal to retard spark ignition timing by a predetermined magnitude and subsequently advance the spark ignition timing by a given magnitude which is substantially smaller than said predetermined retarding magnitude, during said first predetermined period.

20. A spark ignition timing control system as set forth in claim 19, wherein said third means advances said spark ignition timing in response to engine speed fluctuation in the decelerating direction and retards said spark ignition timing in response to engine speed fluctuation in the accelerating direction, during a second predetermined period of time following said first predetermined period during said acceleration transition period.

21. A spark ignition timing control system as set forth in claim 20, wherein said third means varies the magnitude of advancing and retarding of the spark ignition timing in response to engine speed fluctuation, according to engine speed.

22. A spark ignition timing control system as set forth in claim 21, wherein said third means derives said magnitude of advancing or retarding of the spark ignition timing as a function of the engine speed.

23. A spark ignition timing control system as set forth in claim 17, wherein said second means is associated with a throttle angle sensor as a sensor for monitoring engine load indicative parameter, which monitors a throttle valve angular position to produce a throttle angle signal, for detecting increase of throttle valve angular displacement to increase throttle valve open angle in a ratio greater than a predetermined value for producing said accelerating condition indicative signal.

24. A spark ignition timing control system as set forth in claim 23, wherein said sensor means comprises a crank angle sensor for producing a crank reference signal at predetermined angular increments of a crankshaft, and said first means derives said engine speed on the basis of an interval between subsequently occurring crank reference signals.

25. A spark ignition timing control system as set forth in claim 24, wherein said third means is responsive to said accelerating condition indicative signal to retard spark ignition timing by a predetermined magnitude and subsequently advance the spark ignition timing by a given magnitude which is substantially smaller than said predetermined retarding magnitude, during said first predetermined period.

* * * * *